US011112291B2

(12) United States Patent
Philipp (10) Patent No.: US 11,112,291 B2
(45) Date of Patent: Sep. 7, 2021

(54) DETERMINING A WASTE WATER FILLING LEVEL IN A VEHICLE TANK, MEASURING ARRANGEMENT AND WASTE WATER ARRANGEMENT (71) Applicant: APPARATEBAU GAUTING GMBH, Gilching (DE)

(72) Inventor: Jan Boris Philipp, Munich (DE)

(73) Assignee: APPARATEBAU GAUTING GMBH, Gilching (DE)

( * ) Notice: Subject to any disclaimer, the term of this patent is extended or adjusted under 35 U.S.C. 154(b) by 544 days.

(21) Appl. No.: 16/008,373

(22) Filed: Jun. 14, 2018

(65) Prior Publication Data
US 2018/0364088 A1 Dec. 20, 2018

(30) Foreign Application Priority Data

Jun. 14, 2017 (DE) .......................... 102017005626.9

(51) Int. Cl.
  *G01F 23/00* (2006.01)
  *B60K 15/06* (2006.01)
  *G07C 5/00* (2006.01)
(52) U.S. Cl.
  CPC ........ *G01F 23/0069* (2013.01); *B60K 15/061* (2013.01); *G01F 23/0007* (2013.01); *G07C 5/00* (2013.01)
(58) Field of Classification Search
  CPC ............. G01F 23/0069; G01F 23/0007; B60K 15/061; G07C 5/00
  See application file for complete search history.

(56) References Cited

U.S. PATENT DOCUMENTS 5,035,140 A   7/1991 Daniels et al.
6,263,916 B1 * 7/2001 Rumpf ................. B60K 15/061
                                                          137/392

(Continued)

FOREIGN PATENT DOCUMENTS

EP              0 295 508 A1    12/1988

*Primary Examiner* — Regis J Betsch
*Assistant Examiner* — Jeremy A Delozier
(74) *Attorney, Agent, or Firm* — Scully, Scott, Murphy & Presser, P.C.

(57) ABSTRACT

In a method for determining a filling level (F) of waste water (8) in a tank (6) of a vehicle (2), wherein a respective flushing quantity (P) of waste water (8) is fed to the tank (6) by means of flushing processes, a binary filling signal (L$a$-$e$) (waste water (8) present or not) is determined at at least two measuring positions (20$a$-$e$) at the tank (6) with known filling quantities (M$a$-$e$), the filling level (F) is determined as a sum of a basic filling quantity (B) and an inflow quantity (Z), wherein the basic filling quantity (B) is selected as zero or as the greatest filling quantities (M$a$-$e$) of active filling signals (L$a$-$e$) at a starting time (A), and the inflow quantity (Z) is determined as a sum of all the fed-in flushing quantities (P) from the starting time (A).
A measuring arrangement (12) for determining the filling level (F) contains an evaluation module (14) with an interface (16) for the flushing signals (S), and at least two sensors (18$a$-$e$) for the filling signals (L$a$-$e$), wherein the evaluation module (14) is designed to determine the filling level (F) according to the method according to the invention.
A waste water arrangement (4) with the tank (6) and at least one flushing device (10) contains a measuring arrangement (12) according to the invention.

14 Claims, 4 Drawing Sheets (56) References Cited

U.S. PATENT DOCUMENTS

2012/0222758 A1* 9/2012 Gaertner .............. B61D 35/007
137/347
2018/0135285 A1* 5/2018 Canfield ................... E03D 5/10

* cited by examiner

DETERMINING A WASTE WATER FILLING LEVEL IN A VEHICLE TANK, MEASURING ARRANGEMENT AND WASTE WATER ARRANGEMENT

BACKGROUND OF THE INVENTION

The invention relates to a method for determining a filling level of waste water in a tank onboard a vehicle, a measuring arrangement for determining a filling level of waste water in a tank onboard a vehicle and a waste water arrangement for a vehicle.

DISCUSSION OF THE PRIOR ART

For example, EP 0 295 508 A1 discloses equipping a vehicle in the form of an aeroplane with a waste water tank in order to collect waste water from a washbasin and a toilet.

In particular, during a journey or a flight it is desirable to know, measure or determine the filling level of waste water in the waste water tank. It is known from practice that a filling level measurement is difficult on vehicle waste water tanks since deposits and environmental influences restrict the use of conventional filling level measuring methods. Conceivable solutions for measuring filling levels are based, for example, on capacitive measuring meshes and pressure sensors (absolute pressure and differential pressure). The meshes here have been found empirically to have the problem that deposits give rise to measuring errors. The pressure sensors have relatively large measuring errors, which gives rise to very large measuring inaccuracy levels, in particular in the case of small tanks. Furthermore, the pressure sensors are dependent on the changes in the ambient temperature.

SUMMARY OF THE INVENTION

The invention is directed to the determination of the filling level on waste water tanks of vehicles.

The method is directed at such a tank or assumes such a tank to which a respective flushing quantity of waste water is fed by means of flushing processes.

The vehicle is, in particular, a watercraft, in particular a ship, or an aircraft, in particular aeroplane.

According to the method, a binary filling signal is determined at at least two different measuring positions at the tank. The filling signal indicates, at the respective location or the measuring position at the tank, whether waste water is present there or not, that is to say whether the current waste water filling level has already reached the corresponding measuring position or not. The associated filling quantities of the tank at the corresponding measuring positions are assumed to be known here (e.g. from the tank geometry and the measuring positions or measuring locations at the tank) and are each different from one another. In the method, the filling level is determined as a sum of a basic filling quantity and an inflow quantity.

The basic filling quantity is determined as follows: if none of the filling signals is active, the basic quantity is selected as zero. If at least one of the filling signals is active, initially all the currently active filling signals are determined. The associated filling quantities are determined or evaluated at the corresponding measuring positions at which the active filling signals are present. The largest of the filling quantities determined here is selected as the basic filling quantity.

Initially a starting time is selected for the determination of the inflow quantity. The starting time is that time at which the corresponding basic filling quantity is or has been reached in the tank. The inflow quantity is then determined as a sum of all the flushing quantities which are fed to the tank from the starting time.

If the basic filling quantity is selected as zero and the time at which an actual filling level of zero (empty tank) is known to have been reached is unknown, the time at which the execution of the method according to the invention is started is selected alternatively as a starting time, and all the flushing quantities are added starting from said time. The starting time of the method is e.g. the switching on of a filling level measuring system which executes the method.

In this case, the actual filling quantity can also be different from zero if none of the filling signals is active. For example, a certain content of waste water could already be present in the tank, but said quantity is not yet sufficient to reach the lowermost measuring position at the tank. Nevertheless, from the start of the method all the inflow quantities or flushing quantities are then added in order to indicate at least an increase in the amount of waste water in the tank. As soon as the filling level then reaches the lowermost measuring position (that is to say the one with the smallest filling quantity), the first filling signal becomes active and the basic filling quantity is selected correctly as the associated filling quantity. Then, a new starting time is selected: the starting time for this consideration is then the time when the corresponding lowermost filling signal become active. From then onward, flushing quantities continue to be added incrementally (starting with an inflow quantity of zero) to the basic filling quantity using the inflow quantity.

A corresponding flushing quantity per flushing process can be measured here precisely in each case, but also can be estimated or adopted, for example, from average values. As a rule, the flushing quantity or the sum thereof, that is to say the inflow volume, is known only with a comparatively large error, e.g. 400 ml+/−100 ml. Therefore, use is made of reference points in the form of the comparatively precisely known or determinable filling signals or measuring positions and associated filling quantities.

In other words, each of the measuring positions is thus then monitored to determine whether the binary filling signal thereof changes from an inactive into an active state, which means that at this moment the waste water has reached the measuring position with respect to its filling level, that is to say the filling level now currently corresponds precisely to the filling quantity known at the measuring position.

The binary filling signal can therefore assume two states: "active" and "inactive". However, this can also be generated on the basis of a continuous or multi-value signal, e.g. by monitoring limiting values. An active filling signal means that waste water is present at the measuring position, and the filling level therefore corresponds at least to the corresponding filling quantity. An inactive filling signal means that the filling level has not yet reached the measuring position, and therefore the filling level is less than the corresponding filling quantity.

Measuring positions correspond, for example, to filling quantities of the tank of 10%, 50%, 75% and 100%.

According to the invention, an "aeroplane" can also be understood to be representative for all aircraft in the widest sense, and also includes other flying devices, e.g. helicopters, which are equipped with corresponding waste water systems.

For the description according to the invention, the filling quantities, filling levels etc. initially relate to a known, in particular level, orientation of the tank at rest, that is to say are related to a neutral position of the tank. In this case, the orientation of the waste water surface is known, and this is assumed to be level.

In particular, the method according to the invention covers all flushing processes which feed or can feed waste water to the tank. The filling level is then precisely correlated with the inflow quantity.

According to the invention, a continuous filling level measuring system is thus obtained on the basis of discrete reliable measuring points (filling signals at the measuring positions) and interpolation between them (summing of the inflowing flushing quantities) on the basis of the inflow into the tank. The filling signal can be generated, in particular, by means of a tank position sensor (TPS). In this sense, the invention provides a TPS filling level measuring system.

Within the scope of the present patent application, corresponding tolerances, which are oriented, in particular, according to the inaccuracy of the flushing quantities, filling levels, tank contents, measuring tolerances of sensors etc., are always to be taken into account. This applies, in particular, e.g. to filling levels which are based on estimated or determined flushing quantities.

In one preferred embodiment, for the determination of the flushing quantities which are added to form the inflow quantity, the following procedure is adopted: all the flushing processes are detected from the starting time, and a predefinable flushing quantity is assigned to each flushing process. These flushing quantities are then added to form the inflow quantity.

The predefinable flushing quantity per flushing process is here, in particular, an estimated, averaged or empirically determined flushing quantity, for example a standard flushing quantity for a corresponding flushing process which is usually triggered by the flushing signal. In particular, all the flushing processes are counted and multiplied by a uniform standard value or average value for flushing quantities. However, different classes of flushing signals can be taken into account here, e.g. WC flushing, flushing of a wash basin or of a galley waste disposal unit or operation of a dishwasher. Each class can then be assigned a separate average flushing quantity. The determination of the inflow quantity is then restricted to simply counting flushing processes and multiplying it by the standard flushing quantity. In particular, a corresponding weighting with different standard flushing quantities is thus carried out for flushing processes, for example the flushing processes for wash basins, sinks of a galley, WC or bidet are registered separately, and a corresponding average flushing quantity is assigned to each class of activation processes. A registration accuracy of the quantity of waste water which is fed to the tank is improved in this way.

If appropriate, additional quantities are also registered here which are not registered by a countable flushing process. If, for example, only the activation processes of the WC flushing are registered, an average flushing quantity of the flushing of the toilet plus an average flushing quantity at a wash basin can be used as the flushing quantity, since it can be assumed that whenever the toilet is used the washbasin is also used. It is therefore not necessary to register a separate flushing process for the wash basin. By means of a corresponding procedure it is therefore also possible to register flushing quantities of waste water which cannot be registered themselves on the basis of a flushing process or flushing signal.

In particular, in the method all the flushing devices and/or all the corresponding sensors which can indicate a flushing process (flushing signal) are included in the corresponding determination. It is therefore possible to ensure that as far as possible all the inflow sources for waste water are registered, and it is possible to estimate the inflow quantity particularly precisely.

In one preferred embodiment, for the determination of the starting time, all the filling signals are monitored to determine whether they change from inactive to active. Either the time at which the tank is known to be emptied is determined as the starting time, or the time at which one of the filling signals changes from inactive to active is then selected as the starting time. In the first case it is assumed that the lowest filling level quantity which can be registered by sensor (lowest measuring position) is not positioned at the location of the zero filling quantity. In other words, there is no "tank empty" signal available. Filling levels in the range between an empty tank and the time when the lowest filling quantity is reached can therefore be determined only by means of the inflow quantity. A suitable starting time is to be selected for this. Said starting time is, in particular, that when it is known that the tank is empty or is emptied or in an empty state. In this way, starting times can be determined particularly easily.

In one preferred embodiment, the determined filling level is characterized as unreliable if more than one coherent region of active filling signals and/or more than one coherent region of inactive filling signals are/is detected for accepting measuring positions. "Rising" measuring positions are the measuring positions in the sequence such that their assigned filling quantities always increase. This is to be understood in a generalizing fashion; a sequence of the size of the corresponding filling levels in a rising direction or falling direction is decisive for the coherent regions. This embodiment is based on the idea that there is always a lower region in the tank which is filled with waste water and an upper region which is not filled with waste water. Therefore, all the sensors which are coherent in the flooded region must be active and all the sensors in the non-filled region must be inactive. Inactive filling signals in the region which is filled with waste water or inactive filling signals in unfilled regions therefore indicate a fault, e.g. a malfunction of a sensor system or of the filling signals. In the method it is therefore known that the filling level is currently not reliably determined.

In one preferred embodiment, the determined filling level is characterized as unacceptable if the following criteria are satisfied: in the event that none of the filling signals is active, when the inflow quantity (or in this case the filling level since the basic filling quantity is zero) exceeds the filling quantity of the lowest measuring position. Otherwise (if at least one of the filling signals is active) when the determined inflow quantity exceeds the difference between the associated filling quantities of the currently lowest inactive filling signal and of the currently highest filling signal. In both cases, an inflow quantity is determined which would respectively have to lead to triggering one of the filling signals, specifically in the first case the lowest filling signal would have to be active, since according to the inflow quantity the lowest measuring position would already have to be covered with waste water. In the second case, the next (inactive) filling signal would actually have to be active, this is because the sum of the filling quantity at the currently highest active filling signal and the inflow quantity would already have to cover the corresponding next highest measuring position with waste water.

A further preferred embodiment is based on the situation that a filling level is actually definitively known as an actual filling level in the tank, for example by means of separate measurement or, for example, as a result of the empty state of the tank (filling level equal to zero) becoming known through known emptying of the tank. For this case, from this check time onward a check inflow quantity, which is a sum of all the flushing quantities which are fed to the tank from the check time onward, is additionally determined. A check filling level is then determined as a sum of the actual filling level which has actually become known and the check inflow quantity. This check filling level can always subsequently be compared with the filling level determined according to the method. In the case of deviations, it is also possible to infer a fault here, i.e. the determined filling state is no longer reliable.

In one preferred variant of this embodiment, a full tank is detected if the determined filling level or the check filling level has reached the acceptable tank content. Alternatively or additionally, a fault is detected if the check filling level exceeds a filling quantity which is assigned to a currently inactive filling signal or if the check filling level undershoots a filling quantity which is assigned to a currently active filling signal. Contradictions are therefore discovered between the determined filling level and the determined check filling level which ought to always be consistent.

In one preferred embodiment, the second uppermost measuring position in the tank is monitored for a transition from an inactive to an active filling signal. From such a transition onward, a minimum number of flushing processes or a minimum sum of flushing quantities are still permitted, independently of the filling signal at the uppermost filling position, without a "tank full" signal being produced or filling being ended or prohibited. The number is selected here according to the criterion that the sum of the associated flushing quantities remains below the still remaining fillable tank content. This tank content is determined from the difference between the maximum filling quantities of the tank and the filling quantity of the second highest filling position. It is therefore possible still to ensure a minimum number of flushing processes starting from the activation of the second highest filling signal, without a "tank full" message being able to prevent further filling owing to an incorrect uppermost filling signal.

The object of the invention is also achieved by a measuring arrangement as claimed in Patent Claim 9 for determining a filling level of waste water in a tank onboard a vehicle. The measuring arrangement is configured according to the specifications for a specific vehicle or is based on such a vehicle, and the measuring arrangement is to be used according to specifications in such a vehicle: the vehicle has at least one flushing device which can be activated by a flushing signal. The same applies to the fact that a respective flushing quantity of waste water is fed to the tank whenever the flushing device is activated in a flushing process.

The measuring arrangement contains an evaluation module. The evaluation module contains an interface. The interface leads to at least one of the flushing devices and serves to receive the respective flushing signals. A predefinable flushing quantity of waste water is assigned to each flushing signal in the evaluation module. The measuring arrangement contains at least two sensors which can be mounted at different measuring positions at the tank and are to be mounted according to the specifications. The measuring positions differ here as explained above in respect of the different filling quantities in the tank which are assigned to them at the corresponding measuring positions. The sensors have a signal-transmitting connection to the evaluation module, in order to transmit a binary filling signal, generated by them, to the evaluation module.

The evaluation module is designed here to determine the filling level as a sum of a basic filling quantity and an inflow quantity in accordance with the method according to the invention. The basic filling quantity is determined here on the basis of the filling signals. The inflow quantity is determined on the basis of the flushing signals. However, other information and signals can also be included in the corresponding determinations and calculations here.

The measuring arrangement and at least some of the embodiments thereof as well as the respective advantages have accordingly already been explained in relation to the method according to the invention.

The determination or formation of the filling signals therefore takes place by means of a respective sensor. Therefore, as described above, the basic filling quantity is determined from the sensor signals.

The basic filling quantity is also determined (in particular for an empty tank or underneath the lowest sensor) on the basis of known filling levels, for example for the known empty state of the tank. The inflow quantity is also determined by means of filling signals and/or monitoring of the time, as described above.

A flushing device is, in particular, an electrically activatable water valve on a washbasin or a toilet flush or in a dishwasher etc., or a corresponding activation encoder of a toilet flush or for water usage at a washbasin. The flushing signal is here, in particular, the activation signal for the opening of the water valve. The predefinable filling quantity is, in particular, the known filling quantity at a mounting location, according to the specifications, of the sensor. The flushing quantity is known, for example, from the data of the flushing devices which are correspondingly in accordance with the specifications. The interface and the connection of the flushing devices to the evaluation module are, in particular, an interface with a CAN bus of a vehicle. It is therefore possible to make available the information of flushing devices or filling signals particularly easily by connecting a corresponding sensor system to the CAN bus and receiving the corresponding signals via the CAN bus.

In one preferred embodiment, the flushing quantities and the filling quantities are known on the basis of a tank according to the specifications for the measuring arrangement and a flushing device. The measuring arrangement is then designed in such a way that it is provided according to the specifications for use at the respective specific tanks and flushing devices or elements which are correspondingly of the same type and is also correspondingly configured for them, for example is programmed with the respective filling quantities and flushing quantities. The respective quantities can be determined here (in particular in advance) by measurement, calculation etc. using design data etc. of the entire waste water arrangement composed of the tank and flushing devices etc., for example also by means of tests or empirically or by averaging etc. The quantities are determined, in particular, from the statistical evaluation of specifically measured quantities or flushing processes in waste water arrangements (arrangements which are the same in terms of type) according to the specifications.

In particular, the measuring arrangement is provided for use according to the specifications in a specific vehicle or vehicle type, from which the corresponding tanks and flushing devices and the flushing quantities which occur are known.

In one preferred embodiment, the evaluation module has an interface for flight attitude of the vehicle in the form of an aeroplane. The evaluation module is designed to determine the filling level also as a function of the flight attitude data and a known geometry of a tank which is in accordance with the specifications. As mentioned above, the previous considerations were always related to a tank which was oriented in a level fashion or at a known position. Since in the case of an oblique position of the tank or in the case of acceleration during flight the surface of the fluid is no longer oriented in a level fashion, the same sensors supply different filling signals for the same actual filling level of the tank at different flight attitudes. It is possible to take this into account by means of the flight attitude and, in particular, by means of the geometry of the tank and the position of the sensors at the tank. It is therefore possible to include in the calculations the fact that when the position of the surface in the tank is not level, different sensors are triggered at the same filling level, and the corresponding filling quantities at the measuring positions then change depending on the actual spatial orientation of the tank or orientation of the surface of the waste water in the tank. The filling level calculation therefore also remains correct in all flight attitudes or flight situations.

In one preferred embodiment, the evaluation module contains a filter which is designed to filter the filling signals with respect to unevenesses in the surface of the waste water in the tank. During travel or in flight or during the movement of the tank, the waste water can execute undulating or sloshing movements, and sprays of liquid can arrive at sensors. The sensors can subsequently generate filling signals which do not correspond to the actual filling level of the tank. However, this all gives rise to temporary, periodic or short-term disruptions in the filling signals and can be filtered out by corresponding filter algorithms, such that brief or temporary surface movements of the waste water etc. are not included in the determination of the filling level. Such a filter can therefore also be referred to as a slosh filter. However, the corresponding filtering does not have an effect on the contrasting long-term changes in the filling signals owing to travel positions or flight attitudes which are changed in the long term, such as e.g. in the case of a multi-minute descending or ascending flying operation. These effects are included in the determination of the filling level, in particular by means of the abovementioned flight attitude correction.

The invention is also achieved by a waste water arrangement for a vehicle. Said arrangement contains a tank which can be filled with waste water and which is intended to be accommodated onboard the vehicle, and at least one flushing device which can be mounted in the vehicle and can be activated by a flushing signal, wherein a flushing quantity of waste water is fed to the tank whenever the flushing device is activated in a flushing process. The waste water arrangement contains a measuring arrangement according to the invention.

The waste water arrangement and at least some of the embodiments thereof and the respective advantages were accordingly already explained in relation to the measuring arrangement according to the invention and the method according to the invention.

In a waste water arrangement, in particular the characteristics of the flushing devices, that is to say the flushing quantities which actually occur per flushing process and the geometry of the tank as well as also the corresponding measuring positions and associated filling quantities are thus precisely known and can therefore be taken into account more precisely and reliably in the method. In particular, in the waste water arrangement waste water is fed to the tank exclusively by the activation of a respective one of the flushing devices of the waste water arrangement by means of the respective flushing signal. Each feed of waste water to the tank is registered precisely in this way and can therefore be included in an improved determination of the filling level.

In one preferred embodiment, the sensors are arranged at filling positions of the tank which correspond to uniformly distributed filling quantities in the tank. Alternatively, the sensors are arranged at filling positions of the tank whose associated filling quantities are distributed asymmetrically with respect to upper filling levels. These details also refer again to a neutral position of the tank or a level orientation thereof. As a result of the uniform distribution of sensors with respect to the filling quantities it is ensured that in each case identical inflow quantities are necessary to activate the respective next highest sensor. Faults which arise as a result of the determination of the inflow quantity are therefore uniformly distributed for the entire measuring range between the lowest and uppermost sensor. For the other situation of a symmetrical distribution, the respective inflow quantities decrease for relatively high filling levels, before respectively reaching the filling quantity at the next measuring position. This ensures that in the "upper" filling range of the tank, the more full the tank becomes the finer the gradation of the precise detection of the filling levels can be by means of basic filling quantities by sensor compression. Faults due to incorrectly determined inflow quantities are therefore less significant for high filling levels. Therefore, before the waste water tank is virtually completely filled, it is possible to determine a more precise filling level in the tank and therefore determine more precisely a remaining residual capacity of the tank. For the second case, more precise sensor detection therefore takes place and fewer faults as a result of interpolation in the upper critical filling range are to be expected.

In one preferred embodiment, the method according to the invention as described above is carried out using a measuring arrangement according to the invention and/or using a waste water arrangement according to the invention.

The invention is based on the following realizations, observations and considerations and also has the following embodiments. The embodiments are in some cases also referred to in a simplifying fashion as "the invention" here. The embodiments can also contain parts or combinations of the abovementioned embodiments here or correspond thereto and/or if appropriate also include previously unmentioned embodiments.

The invention is based on the following considerations: a filling level measurement would be possible as follows: a waste water tank has a tank full sensor (TFS) and has an absolute pressure sensor (APS) both in the lower and upper tank regions in each case. A tank full status is detected when the tank full sensor is triggered and the absolute pressure sensors estimate a filling level of greater than 80%.

The basic concept of the invention is based on a change to a plurality of tank position sensors (TPS's) in order to generate respective binary filling signals and a change to interpolation, in particular by means of a counter for flushing processes or flushing signals. Continuous measurement therefore no longer takes place by means of the APS but rather by means of the TPS's and interpolation takes place by means of the flushing counters. A tank full status is implemented, for example, by means of an uppermost TPS (at the location of the maximum filling quantity, that is to say as a TFS) or a TPS which is positioned further down, and interpolation is implemented by means of the flushing counter ("almost full" is detected and the last permitted flushing processes are countered".

The invention is based on the realization that filling level sensors or detectors which provide a binary filling signal (waste water present/not present at the sensor) are practical and reliable. Said filling level sensors or detectors therefore form a reliable basis for determining a filling level. The concept of the invention is to solve the problem of establishing intermediate states of waste water between two sensors or digital measuring points.

The invention is also based on the concept of a "flushing counter", that is to say of a counter for flushing processes. The number of flushing processes is generally known here by means of a CAN bus in the vehicle. Statistically a similar quantity of waste water is always flushed away. Calculating the filling level is therefore possible from the number of flushes (flushing processes). In particular, the flushing counter counts the toilet flushes within the system or vehicle. Specific flushes such as GWDU (Galley Waste Disposal Unit), bidet, . . . are taken into account with weighting according to statistical experience or are also counted by correspondingly monitoring separate flushing devices there.

In particular, the following numbers and associated measuring positions or filling quantities of sensors are provided: two sensors at 0% or 3%, referred to below as "0%", and at 100%, three sensors at 0%, 50/70% and 100%, four sensors at 0%, 33/40%, 66180% and 100%, or five sensors at 0%, 25/30%, 50/60%, 75/90% and 100%. The maximum faults for the specified combinations amount here to 100%, 50%, 33% and 25%. These numbers relate to the evaluations of the sensors at the measuring positions or the binary filling signals. If the inflow quantity is added or the interpolation between two measuring positions is additionally performed, a maximum system error with interpolation at 22%, 11%, 7% and 6% is obtained for the specified variants of two, three, four and five sensors according to the assumption that the flushing quantity is subject to a level of uncertainty of 22%. The measuring positions (sensors, TPS) can be distributed evenly here or can be oriented according to a precision requirement for a specific tank, for example a tank-full-sensitive arrangement can be implemented.

The invention is also based on the concept of a flight attitude correction. Owing to the flight attitude (roll and pitch) the orientation of the water level or waste water level relative to the tank changes and therefore the switching point of the sensors changes (TPS, or filling signals change from inactive to active) relative to the filling level. The flight attitude is, in particular, either transmitted from the vehicle to the system or detected with a sensor. The tank geometry must be known here. It is also possible, given a known changed flight attitude, to infer the actual filling level from the changed sensor signals.

The invention takes into account the following realization: in addition, owing to sloshing movements in the tank a phase occurs in which the sensor or the filling signal (TPS) is switched or not switched depending on the wave state. The signal can be filtered in a plurality of ways, for example a symmetrical filter: in a time interval more than XX % of the measurements are "fully" switched. Alternatively, an asymmetrical filter: "full" measurements are weighted with X and "none-full" measurements are weighted with Y. As a result, the sensor is considered to be switched if more than XX % full measurements occur in one time interval. This also results in filtering of the flight attitude with the same or similarly weighted filter such as the slosh filter and use of the filling level, corrected with respect to flight attitude, as a switching point.

The invention is also based on the concept of flushing counter interpolation. A filling level determination or display can be implemented as follows here.

1. The sensor "A" (for example 5% of nominal switching point) has switched in a filtered fashion (sloshing, flight attitude). As a result, the filling quantity (basic filling quantity) at the sensor "A" (at its measuring position) in the case of an averaged flight attitude is considered to be the filling level. The flushing counter (inflow quantity) is set to 0.

2. The flushing counter counts events (flushing counter=flushing counter+X (X is equal to 1 for standard toilet flush)). This results in a filling level=basic filling level (=filling level of the TPS-A in the case of an averaged flight attitude)+inflow quantity (flushing counter times flush volume). In order to ensure a monotonously increasing indication, the indicated filling level is limited to the value of the next TPS-B (for example 40% of the nominal switching point). The limit is to be optionally corrected by the flight attitude.

3. The TPS-B (for example 40% of the nominal switching point) has switched in a filtered fashion, and the same procedure as in section 1 above is adopted.

The invention is also based on the concept that an additionally global flushing counter for monitoring the system integrity is present in the system. The global flushing counter is reset for the waste service (known emptying of the tank, filling level becomes zero). Monitoring is carried out to ensure that the sensors or filling signals (TPS) switch in the provided sequence with in plausible flush numbers (statistical distribution of the flush volumes). Furthermore, the "sensor contaminated" signal is taken into account in order, if appropriate, to eliminate one TPS sensor and/or request cleaning/repair. A sensor contaminated signal can be detected here either at the signal itself or by means of plausibility checking in the system.

The invention is also based on the concept of tank full deactivation. The tank full deactivation takes place if the sensor or filling signal (TPS) switches with a switching point of 100% (filling quantity). Ensuring the deactivation when the filling level is not detected by means of the TPS 100% owing, for example, to an undetected defect, extreme contamination or permanently extreme flight attitude is carried out by limiting the permissible flushes since the last but one TPS was reached (for example 80% TPS). Furthermore, excessively early deactivation in the case of an incorrect detection of the filling level by means of the TPS 100%, owing to for example an undetected defect or extreme contamination, is prevented by prescribing a minimum number of flushes since the last but one TPS became active (for example 80% TPS).

If the flight attitude is "permanent" such that the TPS 100% switches at, for example, 90% of the actual tank content, a number of permitted flushes before the deactivation occurs after the switching of the TPS.

According to the invention, a continuous filling level measuring system or method is obtained on the basis of discrete, reliable measuring points and interpolation between them on the basis of the inflow into the tank and flight attitude correction.

BRIEF DESCRIPTION OF THE DRAWINGS

Further features, effects and advantages of the invention emerge from the following description of a preferred exemplary embodiment of the invention and the appended figures. In a schematic basic illustration.

DETAILED DESCRIPTION OF THE INVENTION

Figure 1:
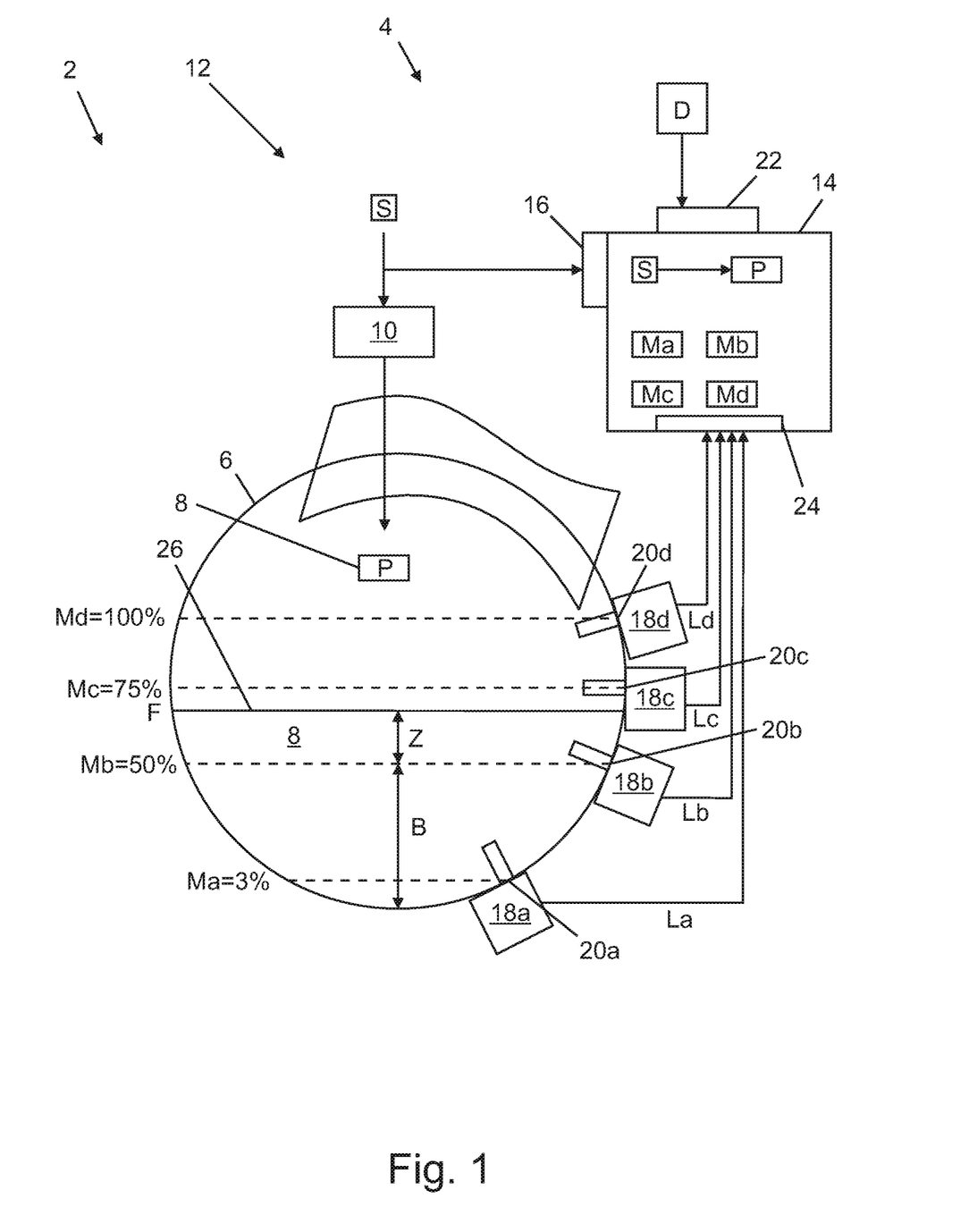
FIG. 1 shows a vehicle with a waste water arrangement according to the invention.

FIG. 1 shows a detail from a vehicle 2, here an aeroplane, specifically a waste water arrangement 4 in the vehicle 2. The water arrangement 4 contains a tank 6 which can be filled with waste water 8 and is filled here up to a filling level F. The tank 6 is accommodated onboard the vehicle 2. The waste water arrangement 4 also contains a flushing device 10 which is mounted in the vehicle 2. The flushing device 10 can be activated by means of a flushing signal S. A flushing quantity P of waste water 8 is fed to the tank 6 whenever the flushing device 10 is activated by the flushing signal S, in a flushing process. In the example, the flushing device 10 is a water valve of a WC or alternatively a vacuum valve of a vacuum toilet, and the flushing signal S is an activation signal for the WC flush.

The waste water arrangement 4 contains a measuring arrangement 12. The measuring arrangement 12 serves to determine a filling level F of the waste water 8 in the tank 6 onboard the vehicle 2. The measuring arrangement 12 contains an evaluation module 14. The evaluation module 14 contains an interface 16 with the flushing device 10 or with all the flushing devices 10, of which only one is illustrated by way of example in FIG. 1. The interface 16 serves to receive the respective flushing signals S with which the respective flushing devices 10 are operated. A respective predefinable flushing quantity P of the waste water 8 is assigned to each flushing signal S in the evaluation module 14, which flushing quantity P is fed to the tank 6 during the relevant flushing process which was triggered by this flushing signal S.

The measuring arrangement 12 also contains, in the example, four sensors 18a-d which are mounted at different measuring positions 20a-d at the tank 6. The sensors 18a-d have a signal-transmitting connection to the evaluation module 14, that is to say the corresponding sensor information is available in the evaluation module 14. Each of the sensors 18a-d generates a respective binary filling signal La-d which is passed onto the evaluation module 14 via the signal-transmitting connection. Each of the filling signals La-d respectively indicates whether waste water 8 is present (active) or not (inactive) at the corresponding measuring position 20a-d at the tank 6. The measuring positions 20a-d differ in that they correspond to different filling quantities Ma-d of the tank 6 or the sensors 18a-e are mounted there. The filling quantity Ma-d is that quantity of waste water 8 which has to be fed to the tank 6 before the corresponding filling signal La-d can change from inactive to active. The respective change of the filling signal La-d from inactive to active therefore indicates that the current filling level F has just reached the respective filling quantity Ma-d. In the figure the filling quantities Ma-d are indicated by dashed lines.

The tank geometry and the corresponding filling quantities Ma-d are known. Each of the filling signals La-d is therefore assigned the corresponding filling quantity Ma-d in the evaluation module 14. The evaluation module 14 is designed to determine the filling level F as a sum of a basic filling quantity B and an inflow quantity Z. The basic filling quantity B is determined on the basis of the filling signals La-d. The inflow quantity Z is determined on the basis of the flushing signals S. Both the flushing quantities P and the filling quantities Ma-d are known on the basis of the tank 6 which is according to the specifications for the measuring arrangement 12 and the flushing devices 10 which are according to the specifications.

The evaluation module 14 also has an interface 22 for flight attitude data D, or for receiving said data, of the vehicle 2. The evaluation module 14 is designed to determine the filling level F also as a function of the flight attitude data D and the known geometry of the tank 6.

The evaluation module 14 also contains a filter 24 which is designed to filter the filling signals La-d. The filter 24 filters out signal fluctuations in the respective filling signal La-d here as a result of unevenesses or movements of the surface 26 of the waste water 8. A correspondingly filtered filling signal La-d therefore indicates a change of the value from inactive to active when the actual filling level F reaches the respective filling quantity Ma-d, independently of wave moments, sloshing movements or other surface movements of the waste water 8.

In the example in FIG. 1, the sensors 18a-d are arranged at measuring positions 20a-d of the tank whose associated filling quantities Ma-d are distributed with respect to upper filling levels F. The filling quantities are: Ma=3%, Mb=50%, Mc=75% and Md=100%.

The following method is carried with the measuring arrangement 12 or the waste water arrangement 4.

The method serves to determine the current filling level F of the waste water 8 in the tank 6 onboard the vehicle 2. According to the method, in each case the binary filling signal La-d is determined at the four measuring positions 20a-d at the tank 6, said filling signal La-d indicating in each case whether waste water 8 is present in the tank 6 (L=active) or not (L=inactive) at the respective measuring position 20a-d. The associated filling quantities Ma-d of the tank 6 at the respective measuring positions 20a-d are known and are each different from one another. The filling level F is determined as a sum of the basic filling quantity B and the inflow quantity Z. These are determined as follows:

If none of the filling signals La-d is active, the basic filling quantity B=0 is selected. However, the filling signals La, b are active at the filling level F shown, since the corresponding sensors 18a, b detect waste water 8 there. The filling signals Lc-d are inactive, since no waste water 8 is detected there by the sensors 18c, d. Since the filling signals La, b have been determined as active in the method, the associated filling quantities Ma, b are compared. The largest of these filling quantities Ma, b, here the filling quantity Mb of 50%, is selected as the basic filling quantity B as equal to 50%.

Initially a starting time A is selected for the determination of the inflow quantity Z.

Figure 2:
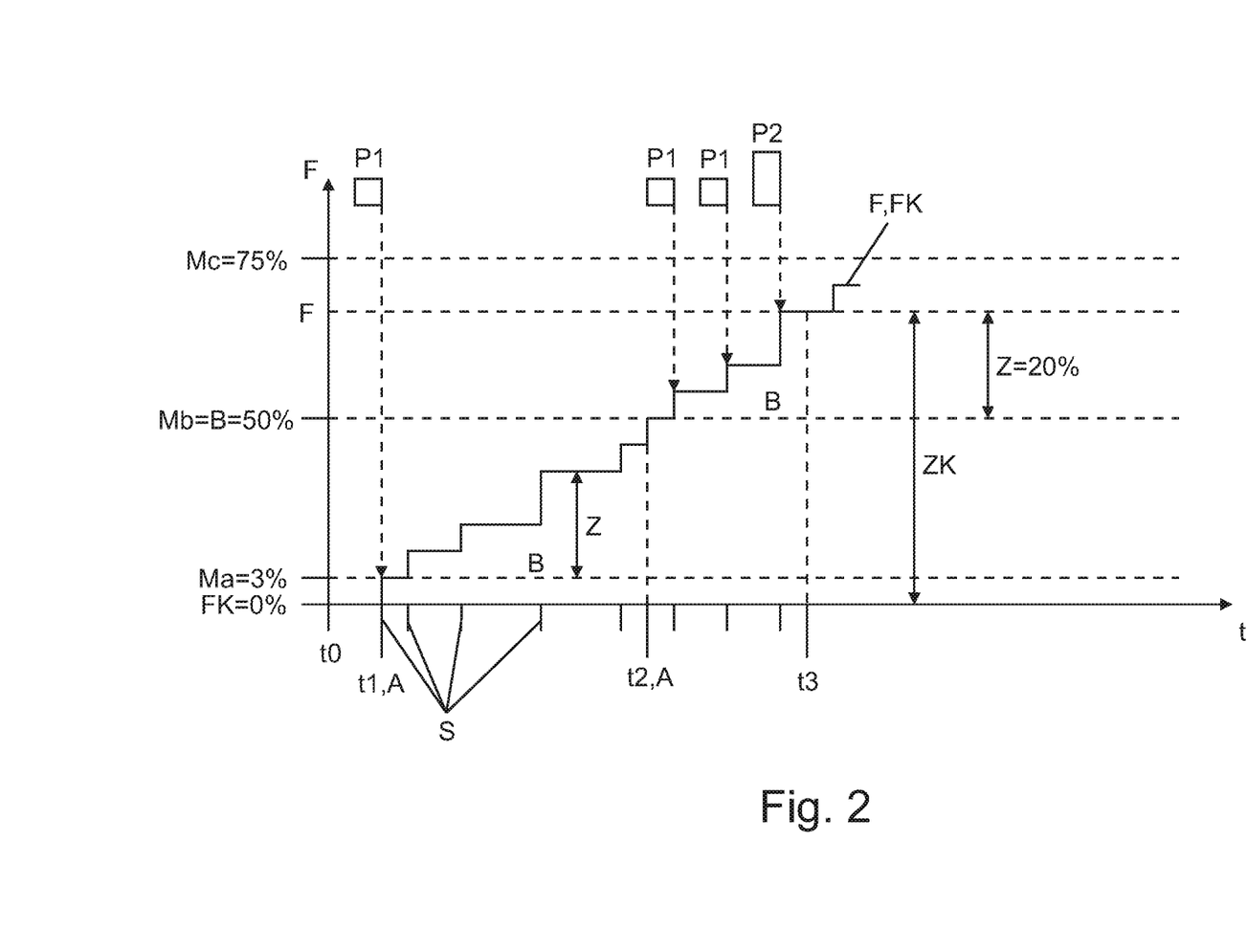
FIG. 2 shows the profile of a filling level plotted over time.

FIG. 2 shows by way of example or symbolically plotted against the time t the processes in the waste water arrangement 4 or in the measuring arrangement 12. The starting time A is that time at which the basic filling quantity B is or has been reached in the tank 6. This is the time at which the filling level F had reached the measuring position 20b. The inflow quantity Z is then determined as a sum of all the flushing quantities P which have been fed to the tank 6 from the starting time A.

For this purpose, all the flushing processes are detected by means of the respective flushing signal S from the starting time A, and a respective flushing quantity P is assigned to each flushing process. In the example according to FIG. 2, these are still the flushing quantities 2×P1 and P2. The corresponding flushing quantities P are then added and yield the inflow quantity Z. For the determination of the starting time A, all the filling signals La-d are then monitored to determine whether they change from inactive to active. The respective time at which one of the filling signals changes from inactive to active is selected as the starting time A.

Alternatively, the time at which the tank 6 is known to be emptied, that is to say the filling level F becomes or is known to be zero, is selected as the starting time. This applies, in particular, to the case in which a sensor is not arranged at a filling quantity M=0 in the tank 6, for which reason a "tank empty signal" is not available in such a situation.

In the method, a determined filling level F is characterized as unacceptable if more than one coherent region of active filling signals La-d and/or more than one coherent region of inactive filling signals La-d are/is detected for rising measuring positions, that is to say here in the sequence 20a-d ("rising" since the corresponding filling quantities Ma-d are respectively rising). In the present case, the filling signals La, b are active, that is to say they form a coherent region in a rising direction. The filling signals Lc, d are inactive and therefore also form a coherent region. The filling level F is therefore not to be characterized as unacceptable.

The filling level F would be incoherent, for example, if the filling signal La were incorrectly inactive in the illustrated situation. Then, said filling signal La would form a first region of inactive flushing signals. A region of active filling signals with the filling signal Lb would then follow, and then a further region of inactive filling signals Lc, d. The regions of inactive filling signals would then not be coherent and the determined filling level F would be characterized as unacceptable.

The determined filling level is also characterized as unacceptable if there is no filling signal active and the filling level F which is then determined by means of the inflow quantity Z exceeds the lowest filling quantity Ma. Since active filling signals are present, this does not apply. Alternatively, the filling level F is unacceptable when the inflow quantity Z exceeds the difference between the associated filling quantities of the currently lowest inactive filling signal (here Lc) and of the currently highest active filling signal (here Lb). The difference would correspond to the waste water quantity Mc−Mb=75%−50%=25%. In the situation shown in FIG. 2, the inflow quantity Z=20%, and the filling level F is acceptable.

In the example, a specific filling level F, here the actual filling level F=0, is known definitively by virtue of the fact that at a check time t0 the tank 6 has been known to be emptied. From this time onward a check inflow quantity ZK is determined as a sum of all the flushing quantities P which are fed to the tank 6 from this check time t0 onward. The check filling level FK is determined as a sum of all the check inflow quantities ZK and the known actual filling level F=0. Since a fault-free case is present here, in FIG. 2 the check filling level FK has a profile equal to the filling level F.

A full tank would be detected when the determined filling level F or the check filling level FK reaches the permissible tank content. This is not yet the case in the example.

A fault is detected if the check filling level FK exceeds a filling quantity Ma-d which is assigned to a currently inactive filling signal La-d or if the check filling level FK undershoots a filling quantity Ma-d which is assigned to a currently active filling signal La-d. This is not the case in the example.

In addition, in the method the second uppermost filling position, here 20c, in the tank 6 is monitored for a transition from an inactive to an active filling signal, here Lc. From such a transition onward, a minimum number of flushing processes or flushing signals S are still permitted independently of the filling signal Ld at the uppermost measuring position 20d, wherein the number of permitted flushing signals S is selected according to the criterion that the sum of the associated flushing quantities P is below the difference between the maximum filling quantity of the tank 6 and the filling quantity of the second highest filling position (here Mc). If e.g. a flushing quantity P1=5% occurs, five flushing processes with flushing quantities P1 are still permitted starting from the filling level F=B=Mc=75%.

According to FIG. 2, the tank 6 is emptied at the check time t0, that is to say has a known filling level F=FK=B=0%. Since it is then known at this time that the tank 6 is empty, the starting time A is selected here. A respective flushing signal S and a corresponding feed of waste water 8 into the tank 6 take place at times which are each indicated by dashes, wherein a respective flushing quantity P1 or P2>P1 is fed to the tank. Here, respective flushing quantities P1 are fed by means of a washbasin, and flushing quantities P2 by means of a toilet flush. These are added to form a respective inflow quantity Z, and the filling level is obtained here as F=Z, since B=0.

At a time t1, the filling level reaches (after a single feed of P1) the filling quantity Ma=3%, that is to say the measuring position 20a at the tank at which the sensor 18a is mounted. The corresponding filling signal La changes here from inactive to active. At the time t1, the basic filling quantity B is therefore set to the filling quantity Ma, and the inflow quantity Z is selected again as 0, and the time t1 is selected as the new starting time A. A respective inflow quantity Z is obtained from then again from the addition of the flushing quantities P which are associated with the flushing signals S. The inflow quantity Z therefore begins to increase again until the filling level F reaches the filling quantity Mb. The tank 6 is therefore filled further by means of further flushing signals S, for which reason Z increases, and the filling levels are obtained as F=Ma+Z.

The filling level F reaches the filling quantity Mb at the time t2. The basic filling quantity B is then set to Mb, and the inflow quantity Z is selected again as 0, and a new starting time A is selected once more at t2. Then three flushing signals S with the quantities P1, P1 and P2 also occur up to the current time t3 of the current consideration according to FIG. 1. The inflow quantity Z is therefore the sum of P1+P1+P2 and is added to the basic quantity B=Mb, which ultimately gives rise to the current filling level F=Mb+Z.

Figure 3A:
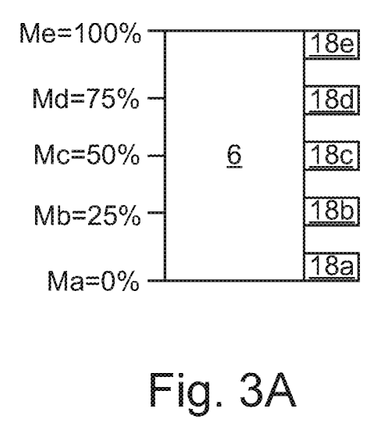
FIGS. 3A-3C show various tanks and sensor assignments.
Figure 3B:
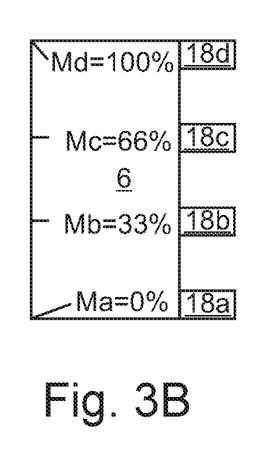
Figure 3C:
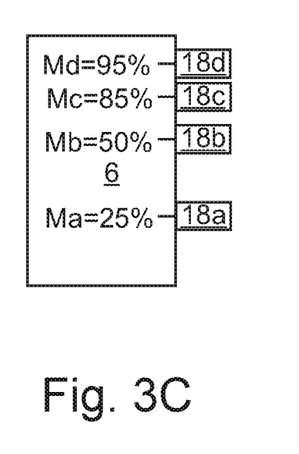

FIGS. 3A-3C show by way of example various arrangements of sensors 18a-e at measuring positions 20a-e of different tanks 6. According to FIG. 3A, 5 sensors 18a-d are arranged uniformly distributed at filling quantities Ma-e=0%, 25%, 50%, 75% and 100%. FIG. 3A shows alternatively also the arrangement of three uniformly distributed sensors 18a, c, e at Ma,c,e=0%, 50% and 100%. The four sensors according to FIG. 3B are arranged uniformly distributed at Ma-d=0%, 33%, 66% and 100%. FIG. 3C shows four sensors 18a-d at measuring positions 20a-d whose associated filling quantities Ma-d are distributed asymmetrically with respect to upper filling levels, specifically at 25%, 50%, 85% and 95%.

Figure 4A:
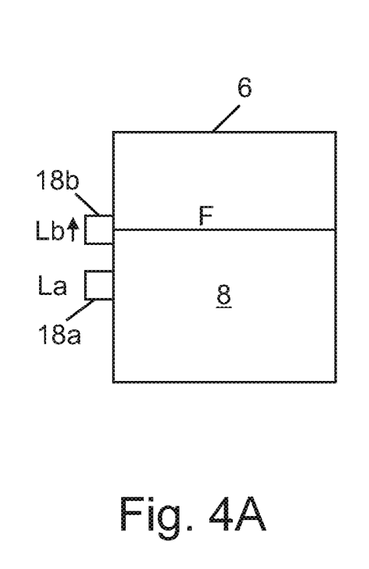
FIGS. 4A and 4B show a tank in various flight attitudes.
Figure 4B:
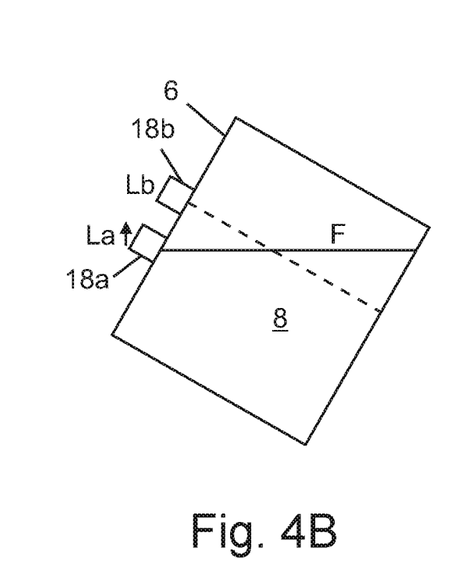

FIGS. 4A-4B show merely by way of example how flight attitude data D contribute to determining the filling level F, here a basic filling quantity B. In FIG. 4A, the vehicle 2, and therefore the tank 6, is oriented horizontally. The moment of the transition of the upper sensor signal or filling signal Lb from inactive to active at a specific filling level F, here for example F=Mb=100 litre, is illustrated. Therefore, the corresponding basic filling quantity B=100 litres is determined. The rise in the filling signal from inactive to active is symbolized by an arrow.

FIG. 4B shows the same situation for a changed flight attitude (oblique position) of the vehicle 2 and therefore of the tank 6. The filling level of 100 litres is also just reached here. However, owing to the oblique position only the lower sensor 18a actually responds here, i.e. the filling signal La becomes active. Since the flight attitude data D are included in the calculation, the evaluation module knows the changed filling quantities M', which are then assigned to the filling signals L. Therefore, the filling level F=B=100 litres is also determined here on the basis of the filling quantity Ma'=100 litres.

Figure 5A:
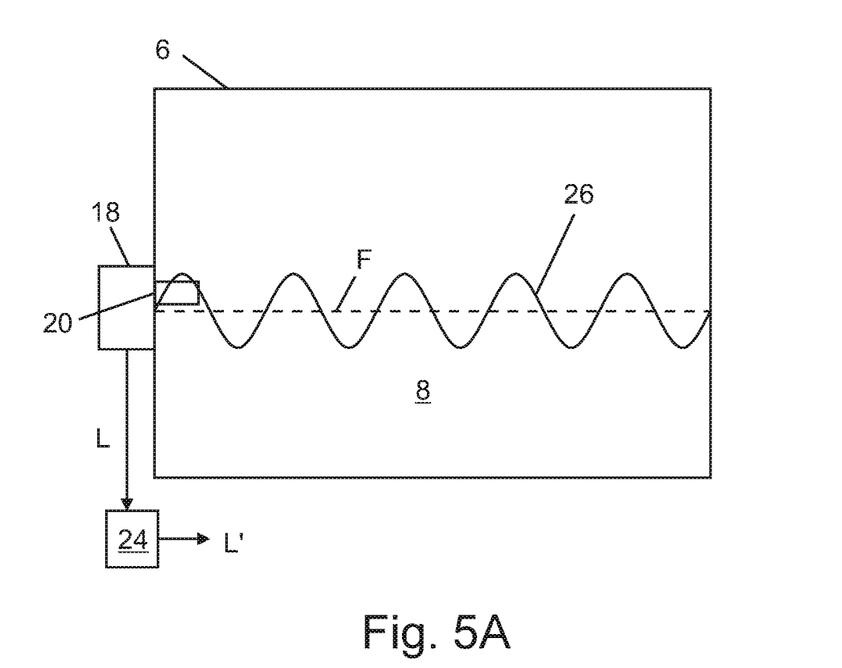
FIG. 5A shows a tank with a non-level surface of waste water
Figure 5B:
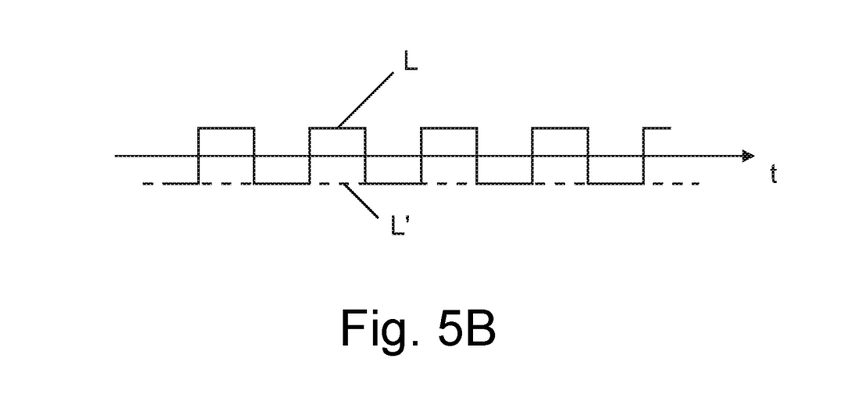
FIG. 5B shows an associated filling signal.

FIGS. 5A and 5B show the effect of a filter 24 on the associated filling signal L in the case of an uneven surface 26 of the waste water 8. As a result of waves or sloshing movements of the waste water 8 according to FIG. 5A, the filling signal L always provides changing signal values inactive ("0"), active ("1"), inactive, active, . . . over the time t according to FIG. 5B. The averaged filling level F (waste water 8 in the case of an uneven surface 26) is indicated by dashed lines and lies below the measuring position 20 at which the sensor 18 changes from inactive to active.

By means of a corresponding filter 24, the corresponding wave moments are filtered out, with the result that the filtered filling signal L' (indicated by dashed lines) represents a state which corresponds to the actual filling quantity in the tank 6, here an inactive signal, since the effective waste water level in the tank 6 still lies below the measuring position 20.

LIST OF REFERENCE SYMBOLS

2 Vehicle
4 Waste water arrangement
6 Tank
8 Waste water
10 Flushing device
12 Measuring arrangement
14 Evaluation module
16 Interface (flushing signal)
18a-e Sensor
20a-e Measuring position
22 Interface (flight attitude data)
24 Filter
26 Surface (waste water)
F Filling level
S Flushing signal
La-e Filling signal
P Flushing quantity
Ma-d Filling quantity
B Basic filling quantity
Z Inflow quantity
D Flight attitude data
A Starting time
ZK Check inflow quantity
t0 Check time
FK Check filling level
t Time
t1,2 Time

What is claimed is:

1. A method for determining a filling level (F) of waste water in a tank onboard a vehicle, wherein a respective flushing quantity (P) of waste water is fed to the tank by means of flushing processes,
wherein:
a binary filling signal (La-e) which indicates whether waste water is present there or not is determined at at least two different measuring positions at the tank, wherein the associated filling quantities (Ma-e) of the tank at the measuring positions are known and different,
the filling level (F) is determined as a sum of a basic filling quantity (B) and an inflow quantity (Z), wherein:
  if none of the filling signals (La-e) is active: the basic filling quantity (B) is selected as zero, and
  otherwise all the currently active filling signals (La-e) and the associated filling quantities (Ma-e) are determined, and the largest of the determined filling quantities (Ma-e) is selected as the basic filling quantity (B),
a starting time (A) for the determination of the inflow quantity (Z) is selected as a time at which the basic filling quantity (B) is reached in the tank,
the inflow quantity (Z) is determined as a sum of all the flushing quantities (P) which are fed to the tank from the starting time (A), and
the determined filling level is used to perform either an activation operation for the flushing processes or deactivation operation for the flushing processes.

2. The method according to claim 1, wherein
for the determination of the flushing quantities (P) which are added to form the inflow quantity (Z), all the flushing processes are detected from the starting time (A), and a predefinable flushing quantity (P) is assigned to each flushing process.

3. The method according to claim 1, wherein
for the determination of the starting time (A), all the filling signals (La-e) are monitored to determine whether they change from inactive to active, and either the time at which the tank is known to be emptied is determined as the starting time (A), or the time at which one of the filling signals (La-e) changes from inactive to active is selected as the starting time (A).

4. The method according to claim 1, wherein
the determined filling level (F) is characterized as unreliable if more than one coherent region of active filling signals (La-e) and/or more than one coherent region of inactive filling signals (La-e) are/is detected for rising measuring positions.

5. The method according claim 1, wherein
the determined filling level (F) is characterized as unacceptable
if there is no filling signal (La-d) active: when the filling level (F) exceeds the lowest filling quantity (Ma-d),
otherwise: when the determined inflow quantity (Z) exceeds the difference between the associated filling quantities (Ma-d) of the currently lowest inactive filling signal (La-e) and of the currently highest active filling signal (La-e).

6. The method according to claim 1, wherein
in the event of a filling level (F) being detected as an actual filling level, from this check time (t0) onward a check inflow quantity (ZK) is additionally determined as a sum of all the flushing quantities (P) which are fed to the tank from this check time (t0) onward, and a check filling level (FK) is determined as a sum of the known actual filling level and the check inflow quantity (ZK).

7. The method according to claim 6, wherein
a full tank is detected if the determined filling level (F) or the check filling level (FK) reaches the acceptable tank content, and/or
a fault is detected if the check filling level (FK) exceeds a filling quantity (Ma-d) which is assigned to a currently inactive filling signal (La-d) or if the check filling level (FK) undershoots a filling quantity (Ma-d) which is assigned to a currently active filling signal (La-d).

8. The method according to claim 1, wherein
the second uppermost measuring position in the tank is monitored for a transition from an inactive to an active filling signal (La-e),
from such a transition onward, a minimum number of flushing processes are still permitted independently of the filling signal (La-e) at the uppermost measuring position, wherein the minimum number is selected according to the criterion that the sum of the associated flushing quantities (P) is below the difference between the maximum filling quantity of the tank and the filling quantity (Ma-e) of the second highest filling position.

9. A measuring arrangement for determining a filling level (F) of waste water in a tank onboard a vehicle, wherein the vehicle contains at least one flushing device which can be activated by a flushing signal (S), and a respective flushing quantity (P) of waste water is fed to the tank whenever the flushing device is activated in a flushing process,
having an evaluation module wherein
the evaluation module has an interface with at least one of the flushing devices for receiving the respective flushing signals (S),
wherein a predefinable flushing quantity (Ma-e) of waste water is assigned to each flushing signal (S) in the evaluation module,
the measuring arrangement contains at least two sensors which can be mounted at different measuring positions at the tank and have the purpose of generating the filling signals (La-e) which have a signal-transmitting connection to the evaluation module,
wherein a binary filling signal (La-e) is present in the evaluation module for each of the sensors, said filling signal (La-e) indicating whether waste water is present there or not,
wherein in the evaluation module a known filling quantity (Ma-e) of the tank is assigned to each filling signal (La-e),
wherein the evaluation module is designed to determine the filling level (F) as a sum of a basic filling quantity (B) and an inflow quantity (Z) in accordance with a method according to claim 1, wherein the basic filling quantity (B) is determined on the basis of the filling signals (La-d), and the inflow quantity (Z) is determined on the basis of the flushing signals (S).

10. The measuring arrangement according to claim 9, wherein
the flushing quantities (P) and the filling quantities (Ma-e) are known on the basis of a tank according to the specifications for the measuring arrangement and a flushing device.

11. The measuring arrangement claim 9, wherein
the evaluation module has an interface for flight altitude data (D) of the vehicle in the form of an aeroplane, and the evaluation module is designed to determine the filling level (F) also as a function of the flight altitude data (D) and a known geometry of a tank which is in accordance with specifications.

12. The measuring arrangement according to claim 9,
the evaluation module contains a filter which is designed to filter the filling signals (La-e) with respect to unevennesses in the surface of the waste water in the tank.

13. A waste water arrangement for a vehicle, having a tank which can be filled with waste water and is intended to be accommodated onboard the vehicle, having at least one flushing device which can be mounted in the vehicle and can be activated by a flushing signal (S), wherein a flushing quantity (P) of waste water is fed to the tank whenever the flushing device is activated in a flushing process, wherein
the waste water arrangement contains a measuring arrangement according to claim 9.

14. The waste water arrangement according to claim 13, wherein
the sensors are arranged at measuring positions of the tank which correspond to uniformly distributed filling quantities (Ma-e) in the tank, or
the sensors are arranged at measuring positions of the tank whose associated filling quantities (Ma-e) are distributed asymmetrically with respect to upper filling levels (F).

* * * * *